UNITED STATES PATENT OFFICE.

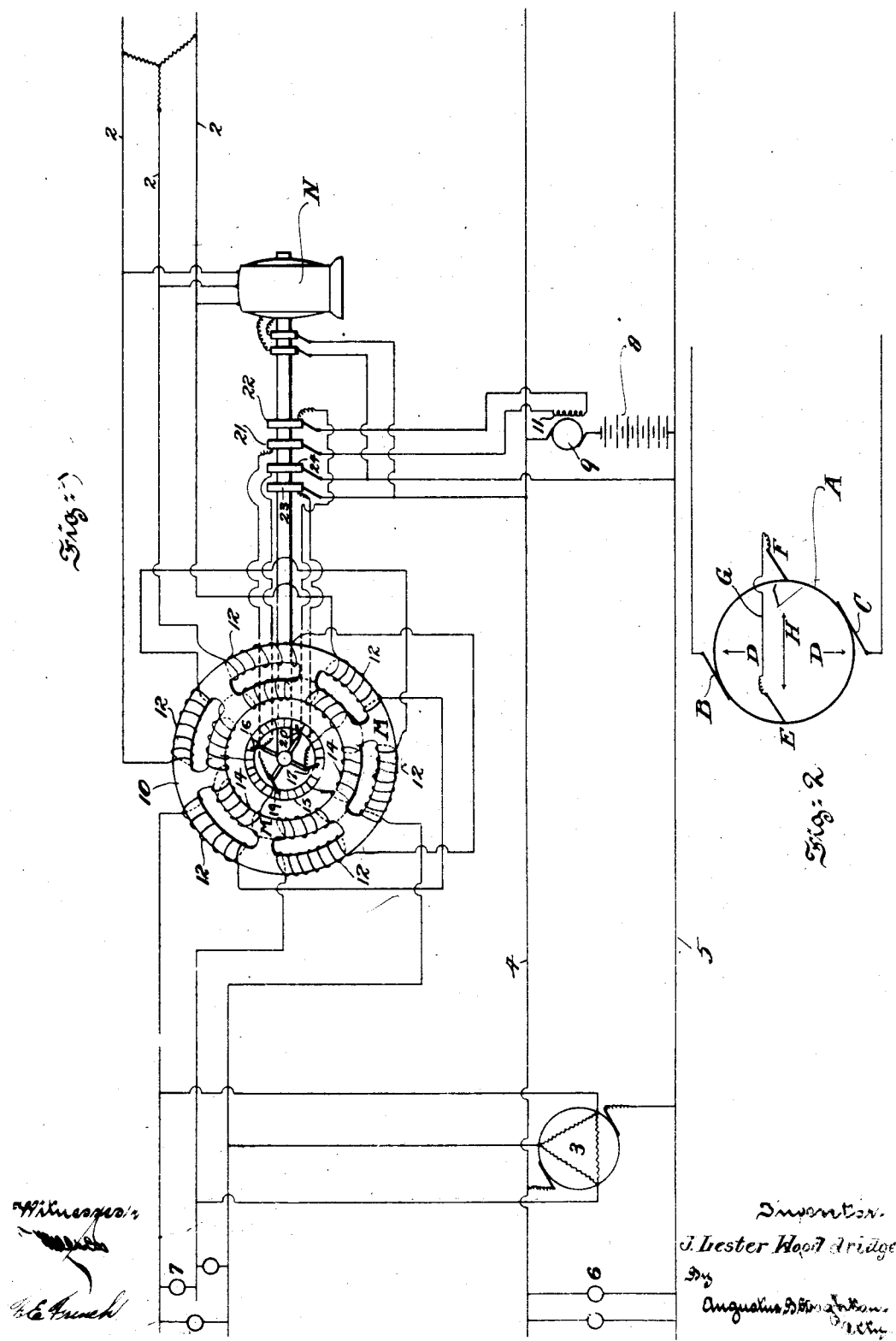

JOSEPH LESTER WOODBRIDGE, OF PHILADELPHIA, PENNSYLVANIA.

SYSTEM OF ELECTRICAL DISTRIBUTION

No. 870,149.      Specification of Letters Patent.      Patented Nov. 5, 1907.

Application filed April 19, 1905. Serial No. 256,477.

*To all whom it may concern:*

Be it known that I, JOSEPH LESTER WOODBRIDGE, a citizen of the United States, and a resident of Philadelphia, in the county of Philadelphia and State of Pennsylvania, have invented a certain new and useful System of Electrical Distribution, of which the following is a specification.

The invention has relation to those systems in which use is made of a battery and its booster in connection with both alternating current and direct current lines.

Objects of the present invention are to make the booster-control responsive to variations in the alternating current circuit, or otherwise stated, to control the field of a booster in such a way that it responds to changes of load in the alternating current circuit; to effect regulation accurately and efficiently; and to provide apparatus for the purposes stated, which shall be simple, reliable and durable, and also rapid in its action.

To these and other ends hereinafter set forth the invention comprises the improvements to be presently described and finally claimed.

The nature, characteristic features and scope of the invention will be more fully understood from the following description taken in connection with the accompanying drawings forming part hereof and in which Figure 1, is a diagrammatic view illustrating a system of distribution embodying features of the invention. Fig. 2, is a diagram which will be hereinafter referred to for purposes of explanation.

In the drawings 1, is a source of alternating current power which is delivered to the transmission lines 2.

3, is a rotary transformer taking current from the alternating current lines 2 and delivering direct current to the circuit 4—5, or taking current from the direct current lines 4—5, and delivering alternating current to the alternating current lines 2.

7 and 6 are alternating current and direct current translating devices respectively arranged in the appropriate circuits.

8, is a battery provided with a booster 9, (which may be suitably driven) and connected across the direct current circuit 4—5.

10, is a device for controlling the field 11, of the booster and it is responsive to changes of current in the alternating current lines 2 and is constructed as follows: 12, are primary windings connected (as shown in pairs) in series with the alternating current lines 2 and adapted to produce a rotating magnetic field in the magnetic circuit on which they are wound, which field will have a strength proportional to the alternating current. The primary windings are arranged upon a suitable frame M, constituting the magnetic circuit. 14, is a secondary winding in inductive relation to the magnetic field produced by the primary windings 12 and to this secondary winding is connected a commutator 15. Both the windings 12 and 14 and the commutator 15 are stationary. The rotating field will produce an electro-motive force in the secondary winding 14 and a potential difference between opposite bars of the commutator 15 whose point of maximum value will rotate with the field.

16 and 17 are direct current brushes revolving about the commutator and maintained at the point of maximum electro-motive force by the synchronous motor N of the revolving field type as here shown driven in synchronism with the revolving field by current from the alternating current circuit 2.

19 and 20 are direct current brushes arranged at right-angles to the brushes 16 and 17 and rotated therewith. The brushes 19 and 20 are electrically connected through the field winding 11 of the booster by the slip rings 21 and 22 and the brushes 16 and 17 are electrically connected to points 4 and 5 in the direct current circuit by the slip rings 23 and 24.

Before proceeding to describe the operation of the apparatus which has been explained, a brief explanation will be given in connection with Fig. 2. Assume that A is a winding and that B, and C, are brushes bearing upon this winding or upon a commutator connected with it and to which brushes B and C, a direct current electro-motive force is applied. Current will tend to flow through the winding from B, to C, and this current will produce a magnetic field D, in the direction B—C. When the brushes B, and C, are rotated this field D, will produce an electro-motive force at right angles to it and following it in its rotation. For the sake of description this electro-motive force may be taken to exist between the points E—F. If to the points E—F, are applied brushes rotating with the brushes B—C, and connected together electrically as by the conductor G, current will flow through the conductor G, and winding A, between the points F and E. This current in the winding produces a field H, in the direction E—F and this field rotating with the brushes produces an electro-motive force at the brushes B—C counter to the electro-motive force applied to these brushes B and C and substantially equal to it, so that only enough current due to the electro-motive force applied at the brushes B—C traverses the winding to maintain the conditions which have been described. From this it follows that if the potential difference between B and C is substantially constant and the proper strength of field H be produced by some external source to oppose the passage of current through the winding from B to C there will be no current traversing the conductor G. If the external source of field excitation be weakened, sufficient current will traverse the conductor G in such direction as to coöperate with the external excitation so as to maintain the field strength H; and if the external source of excitation be strengthened, current will traverse the conductor G in the opposite direction and in amount sufficient by opposing the external excitation to still maintain the field strength H. Thus the current in G will respond in amount and direction to variations in the external source of excitation.

A description of the mode of operation of the apparatus illustrated in Fig. 1, will now be given.

If the current in the alternating current line 2 is sufficient to produce a direct current voltage at the brushes 16 and 17 equal to that on the direct current circuit 4—5 there will be no current in the booster field 11. That is to say in connection with the description given of Fig. 2, the field H, will be maintained from an outside source (imaginary, having regard to Fig. 2, but possible by reason of the coils 12, in Fig. 1) of such strength that there is developed a counter-electro-motive force equal to the electro-motive force applied at B—C. If the alternating current increases, for example, by reason of the presence of an additional load on either circuit, since they are in effect connected together through the rotary 3, current will flow from the brushes 16 and 17 into the direct current circuit in such a direction as to cause a field in the direction 16—17 and a consequent electro-motive force at the brushes 19 and 20, which will excite the booster field in a direction to cause the battery to discharge. In connection with Fig. 2, this may be likened to an addition to the field H from an outside source. If the alternating current decreases as by reason of a decrease in load, the field along the line 16 and 17 will be reversed in direction, reversing the current in the booster field and causing the battery to charge. By changing the potential (which may be anything from zero up) applied to the brushes 16 and 17, or by changing the ratio of turns in the windings 12 and 14, different average loads in the alternating current line 2—2 may be provided for and such changes may be accomplished in a variety of well known ways.

It will be obvious to those skilled in the art to which the invention relates that modifications may be made in detail without departing from the spirit thereof, hence the invention is not limited further than the prior state of the art may require, but

Having thus described the nature and objects of my invention, what I claim as new and desire to secure by Letters Patent is:

1. The combination of a source of alternating current power and its transmission lines including a suitable converter and its direct current transmission lines, a battery and its booster, and a booster controller comprising primary and secondary windings arranged in inductive relation and whereof the latter is provided with a commutator and the former is operatively arranged in the alternating current circuit, and also comprising commutator brushes connected respectively with the direct current lines and with the booster field regulating coil, substantially as described.

2. The combination of a regulating coil, alternating and direct current circuits having connected between them a suitable converter, windings in inductive relation and whereof the primary appertains to the alternating circuit and the secondary is provided with a commutator, and brushes respectively appertaining to the coil and to the direct current circuit, substantially as described.

3. A magnetic circuit all parts of which are relatively fixed, alternating current and direct current means for producing a resultant magnetic field in said circuit, a regulating coil, and means for applying to the regulating coil the electro-motive-force produced by the resultant field.

4. The combination of an alternating current circuit, a fixed primary winding operatively arranged therein for producing a rotary magnetic field, a fixed secondary winding in inductive relation to the magnetic field and provided with a fixed commutator, commutator brushes whereof some are provided with a regulating circuit, means for applying constant direct current potential to the other commutator brushes, and means for rotating all the brushes in synchronism with the rotary field, substantially as described.

5. An alternating current source, a magnetic circuit, means for applying to the magnetic circuit exciting current from the source, a winding in inductive relation to the magnetic circuit, a commutator for said winding, two angularly displaced sets of brushes bearing upon said commutator, means for maintaining relative rotation between commutator and brushes in synchronism with the source, means for fixing the potential difference between the brushes of one set, and a regulating coil connected to the other set.

6. An alternating current source, a magnetic circuit, connections for exciting the circuit from the source, a plurality of conducting coils in inductive relation to the magnetic circuit; commutating devices for said coils including two relatively displaced sets of brushes, means for maintaining relative rotation of the brushes and coils in synchronism with the source, means for fixing the potential difference between the brushes of one set, and means for utilizing the current from the other set.

7. An alternating current circuit, a magnetic circuit, a winding in inductive relation to the magnetic circuit and its commutator; a set of brushes for said commutator; means for applying to the magnetic circuit a source of excitation proportional to the current in the alternating current circuit; means for maintaining between said brushes a direct current difference of potential independent of the alternating current excitation, a second set of brushes for the commutator displaced from the first set, a regulating coil connected to the second set of brushes, and means for producing relative rotation of brushes and commutator.

In testimony whereof I have hereunto signed my name.

J. LESTER WOODBRIDGE.

Witnesses:
W. J. JACKSON,
K. M. GILLIGAN.